July 3, 1956 — E. M. BULL ET AL — 2,752,802

UNIVERSAL INDEX

Filed Sept. 4, 1951 — 6 Sheets-Sheet 1

INVENTORS
EDGAR M. BULL
BY CARL J. DiJULIO

Attorney

July 3, 1956
E. M. BULL ET AL
2,752,802
UNIVERSAL INDEX
Filed Sept. 4, 1951
6 Sheets-Sheet 2
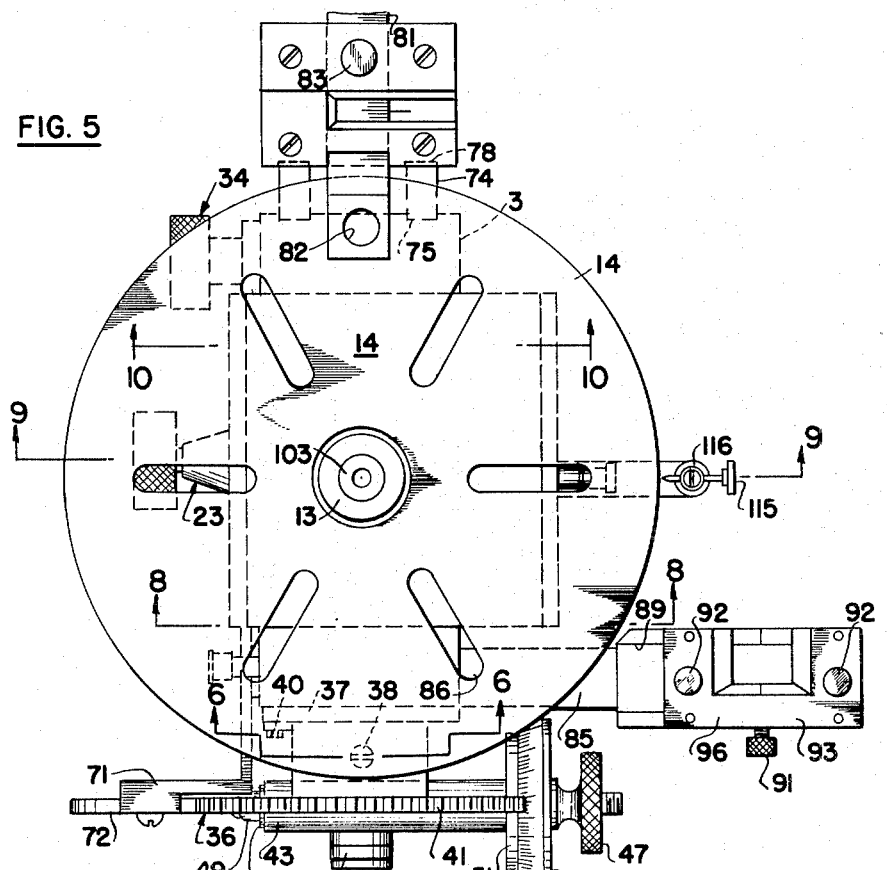
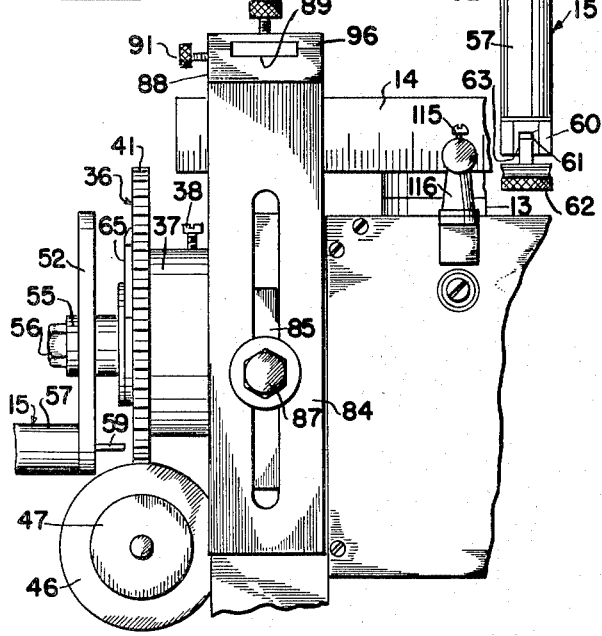
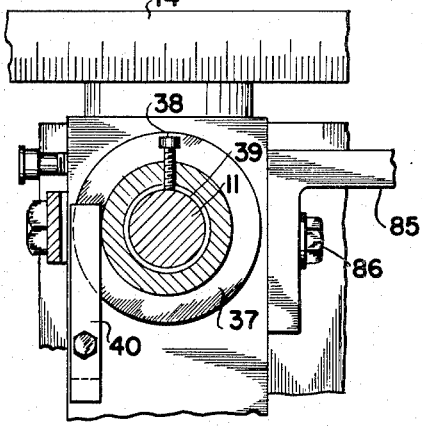
INVENTORS
EDGAR M. BULL
BY CARL J. DiJULIO
Attorney

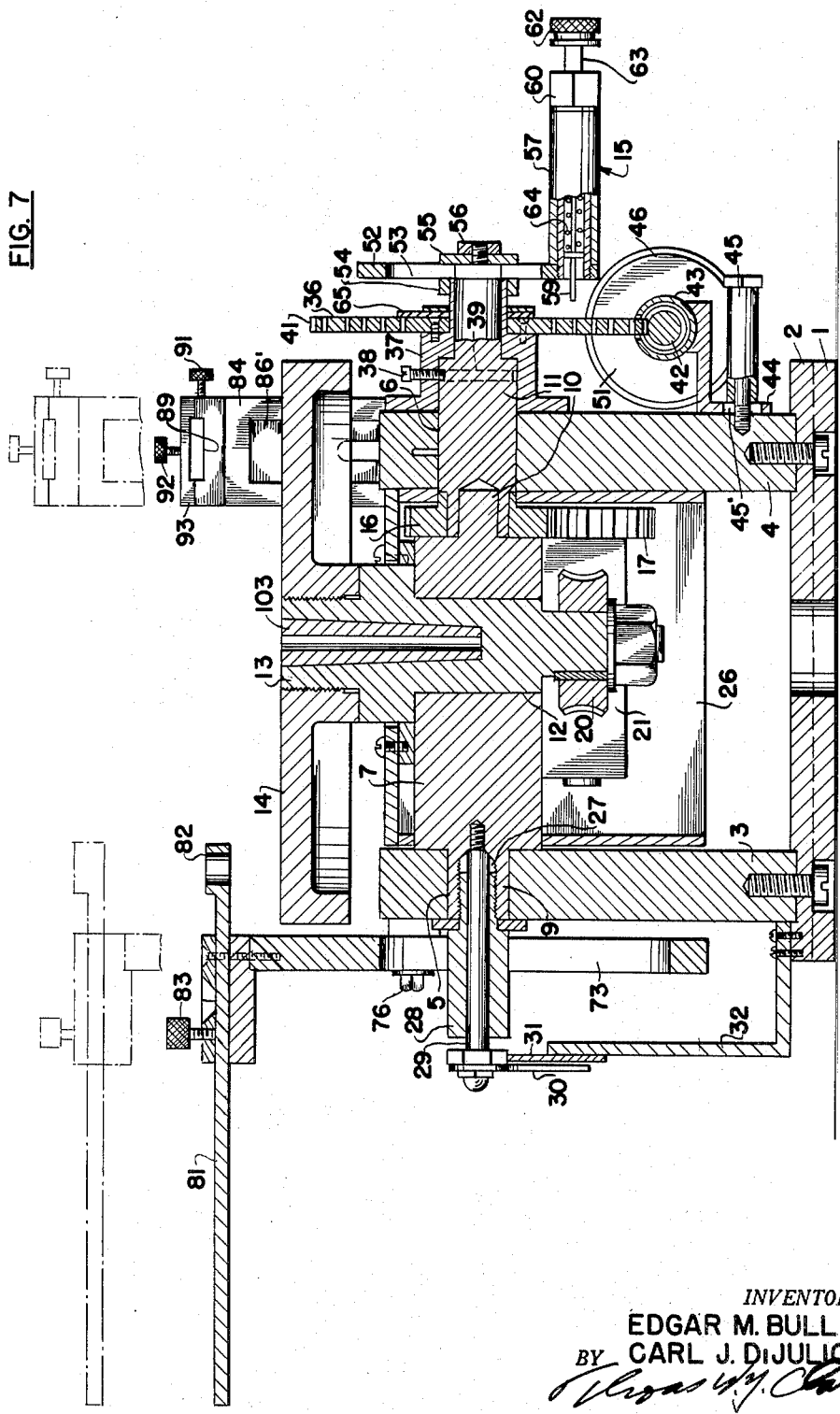

July 3, 1956 E. M. BULL ET AL 2,752,802
UNIVERSAL INDEX
Filed Sept. 4, 1951 6 Sheets-Sheet 4
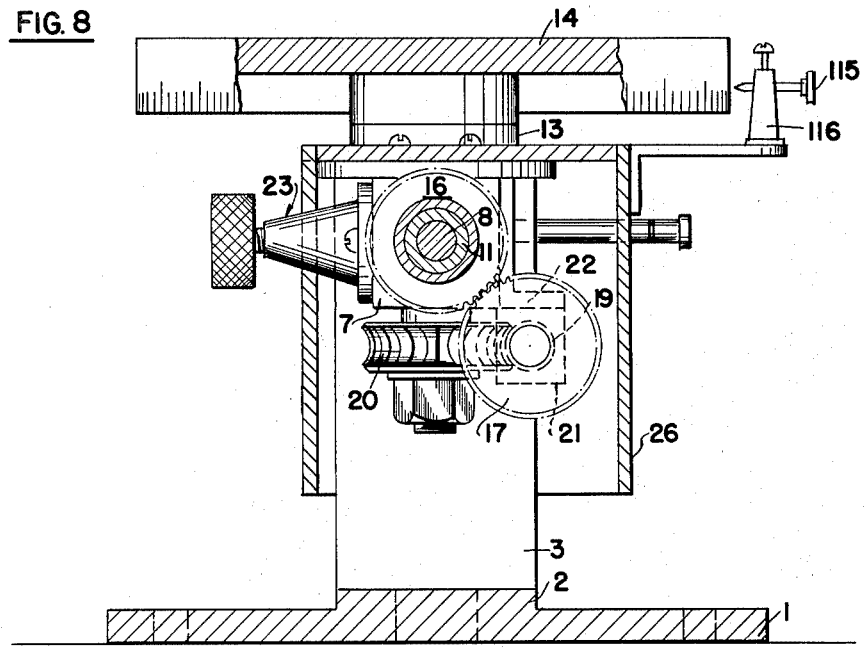
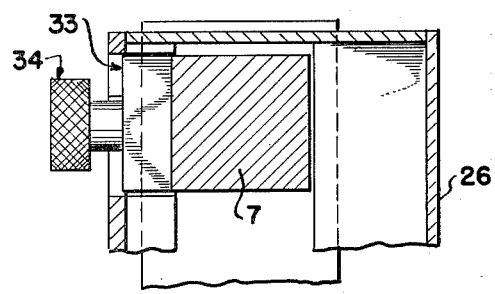
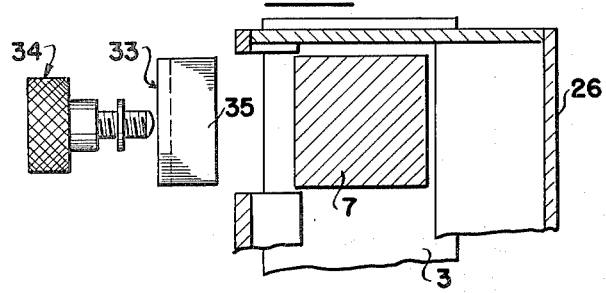
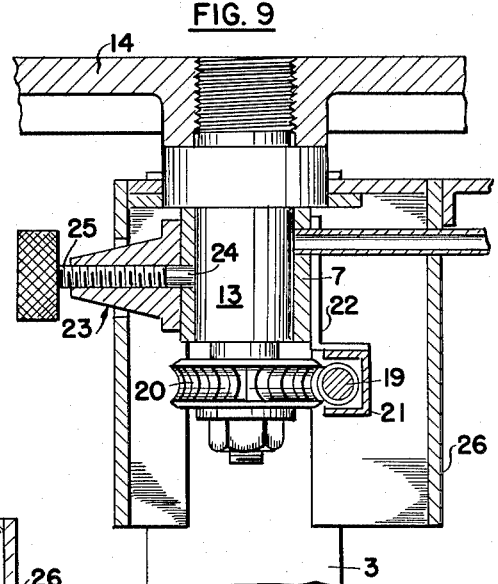
INVENTORS
EDGAR M. BULL
BY CARL J. DiJULIO
attorney July 3, 1956

E. M. BULL ET AL 2,752,802

UNIVERSAL INDEX

Filed Sept. 4, 1951

INVENTORS
EDGAR M. BULL
CARL J. DiJULIO
BY
Attorney

July 3, 1956     E. M. BULL ET AL     2,752,802
UNIVERSAL INDEX
Filed Sept. 4, 1951     6 Sheets—Sheet 6
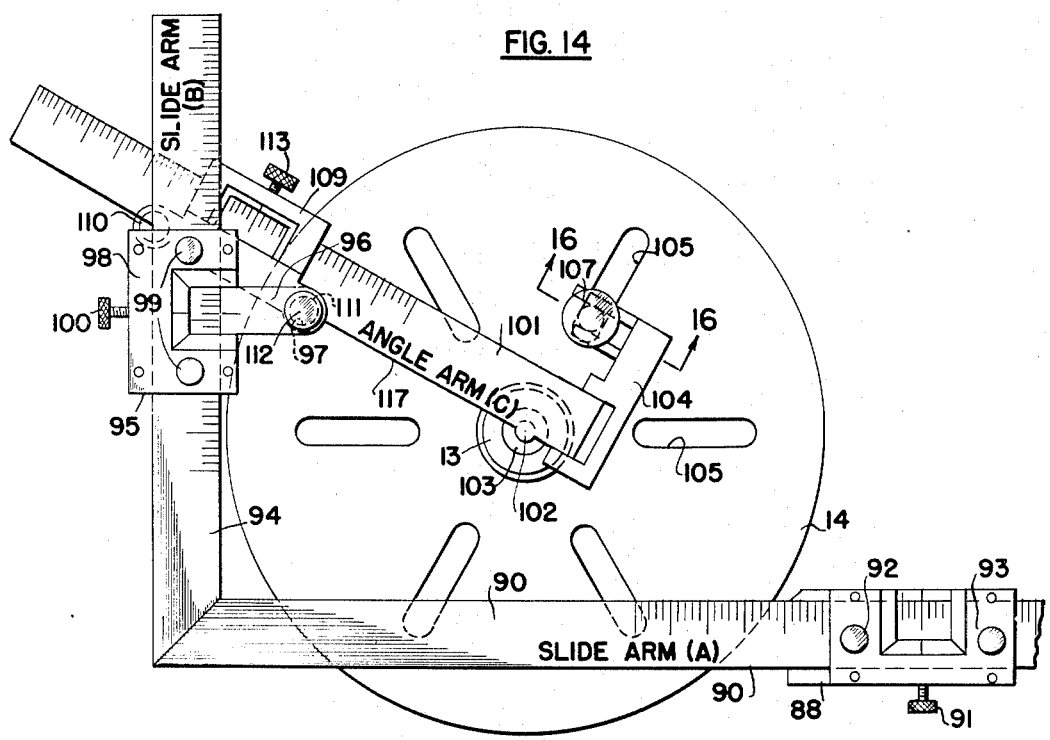
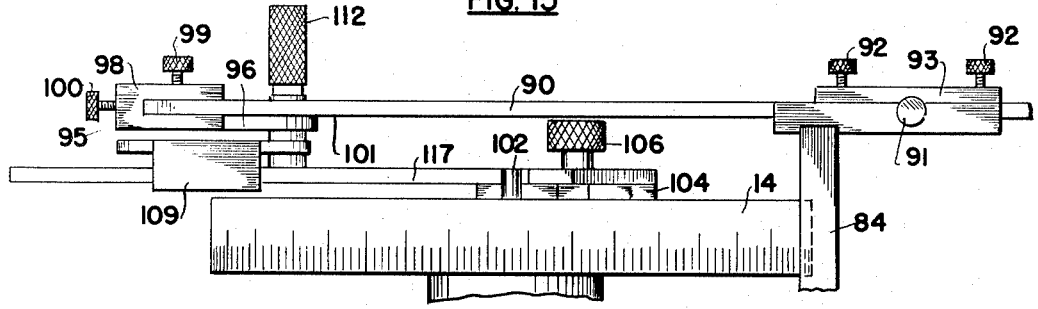
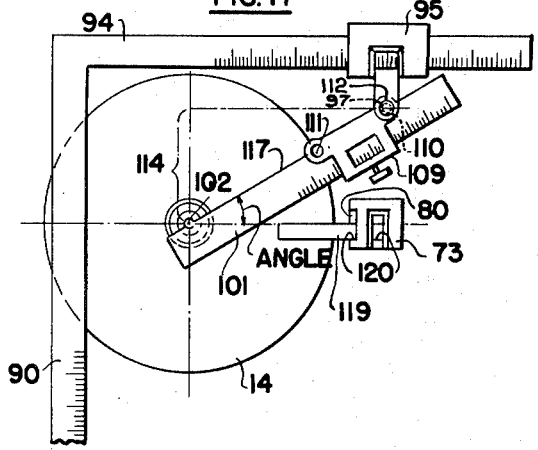
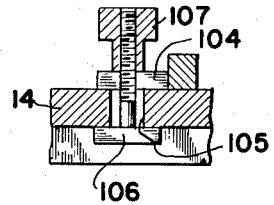
INVENTORS
EDGAR M. BULL
CARL J. DiJULIO
BY
Attorney United States Patent Office 2,752,802
Patented July 3, 1956

2,752,802

UNIVERSAL INDEX

Edgar M. Bull, Anneslie, and Carl John Di Julio, Towson, Md.

Application September 4, 1951, Serial No. 244,936

7 Claims. (Cl. 77—64)

This invention relates to a tool which may be used as a drill jig with an inexpensive drill and which when used in this manner is the equivalent of a high precision jig board many times more expensive. Further, the tool of this invention can be used in determining the dimensions and angles of a part which is to be duplicated or for which other cooperating parts are to be designed. The tool, when used as a jig, will position a drill or the like directly even where the hole is located on a blueprint only by its perpendicular distance from a reference line and its angle from a point on the line. In other words, the tool will solve right triangles as it locates a point or hole. Furthermore, the tool will locate holes to be drilled at an angle to a part where only dimensions perpendicular to the hole axis are given. Thus if the drill is vertical, the part is tilted to the desired angle and the vertical drill can be positioned according to horizontal dimensions and angles. Also the tool will compute trigonometric functions and index a given number of holes in 360° at a desired radius.

A special feature of the invention is a dial associated with a toothed index plate for reading directly in seconds of arc and fractions thereof.

A further feature of the invention is a right angle bar having one arc sliding in a horizontal fixed mounting and a tracer block sliding on the other arm, the bar being associated with a precision angle generating table.

A further feature of the invention is the provision of a horizontally mounted right angle bar as above in conjunction with a precise angle generating table which may be disposed at any desired angle to the horizontal.

A still further feature of the invention is an angle generating arm which may be fixed to the table and which has a tracer block thereon for cooperation with the right angle bar tracer block in solving right triangles.

Other objects, features and advantages of the present invention will be apparent from the following description and the accompanying drawings, in which:

Figure 4 is a partial rear elevational view of the machine.

Figure 5 is a top plan view of the machine.

Figure 6 is a partial sectional view taken along the line 6—6 of Figure 5.

Figure 7 is a transverse sectional view of the machine.

Figure 8 is a longitudinal sectional view taken along the line 8—8 of Figure 5.

Figure 9 is a longitudinal sectional view taken along the line 9—9 of Figure 5.

Fig. 10 is a fragmentary longitudinal sectional view taken along the line 10—10 of Figure 5.

Figure 11 is a view similar to Figure 10 but with the trunnion lock removed.

Figure 14 is a partial top plan view of the machine.

Figure 15 is a partial right side elevation of the machine.

Figure 16 is a sectional view taken along the line 16—16 of Figure 14.

Figure 17 is a top plan view showing the solution of a triangle.

The same numerals refer to similar parts throughout the several views.

Figure 1:
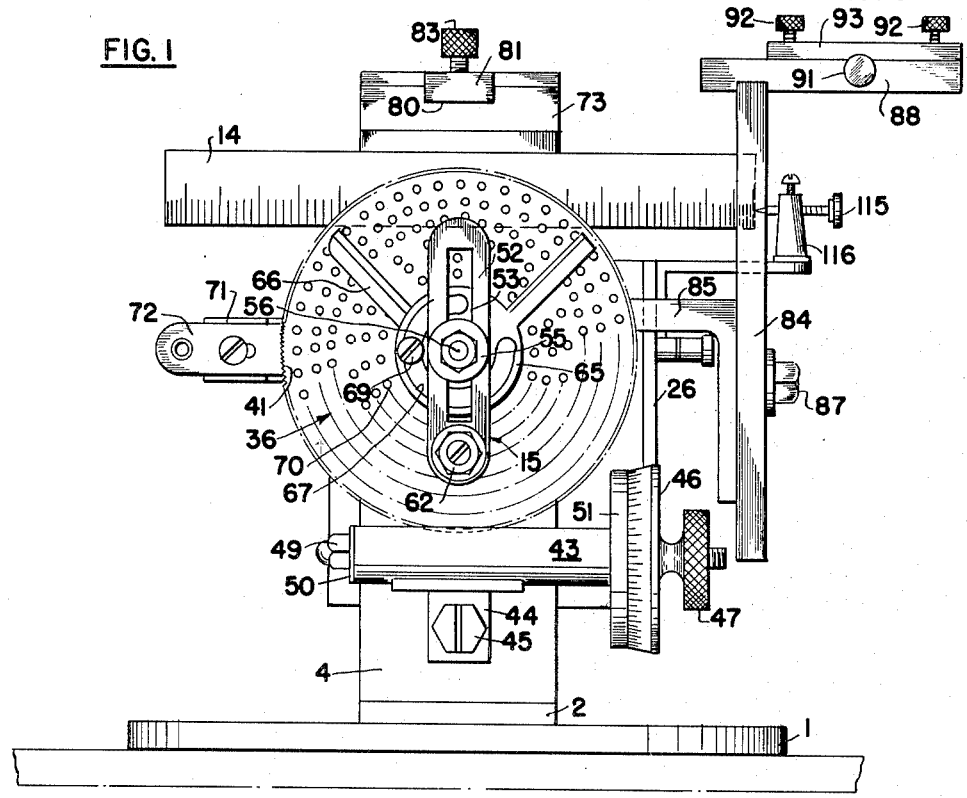
Figure 1 is a side elevational view of the machine showing the indexing mechanism thereof.

Having particular reference to Figure 7, the machine of this invention is mounted on a circular base 1 having a central raised portion 2 extending transversely across the base. Solid rectangular columns 3 and 4 are bolted to the base raised portion 2 at the left and right ends thereof. The columns have aligned circular openings 5 and 6 in the upper ends thereof. A rectangular shaft block 7 has a cylindrical end 9 journaled in opening 5 of column 3 and a cylindrical gear end 10 journaled in gear shaft 11 which in turn is mounted in opening 6 of column 4. The shaft block 7 has a cylindrical opening 12 receiving the spindle 13 to which table 14 is attached.

A crank 15 is fixed to one end of gear shaft 11 and a gear 16 is fitted on the other end. The crank is adapted to rotate table 14 through gear 16, gear 17 meshing therewith, worm 19 on the shaft on which gear 17 is mounted, Figure 8, and worm gear 20 keyed to the lower end of spindle 13. The worm 19 is mounted in worm case 21 supported by bracket 22 which is fastened to the rear side of shaft block 7. A spindle lock 23 having a lock pin 24 and lock screw 25 is provided at the front side of shaft block 7. Gear box 26 is mounted on shaft block 7 and encloses the mechanism between columns 3 and 4.

As seen in Figure 7, the shaft block 7 has a recess 27 at its left end threadedly receiving table lock 28. This lock 28 fixes the shaft block 7 and table 14 at the desired angle. Protractor spindle 29 extends through lock 28 and threadedly engages block 7.

Figures 2, 3:
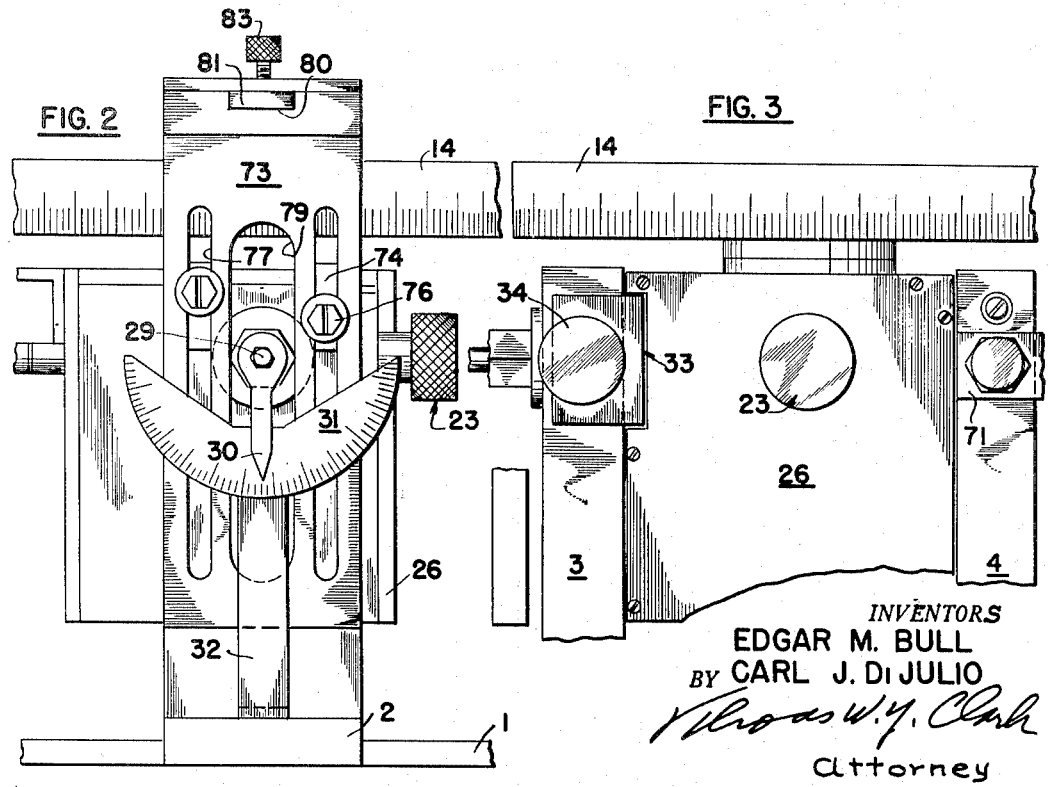
Figure 2 is a partial side elevational view taken from the opposite side of the machine from Figure 1.
Figure 3 is a partial front elevational view of the machine.
Figure 12:
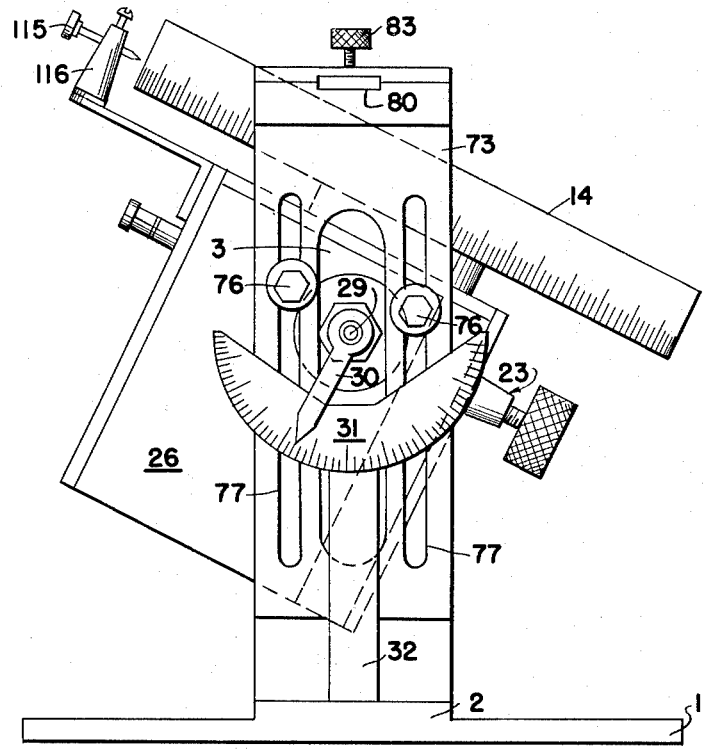
Figure 12 is a left side elevational view similar to Figure 2 but with the table tilted.
Figure 13:
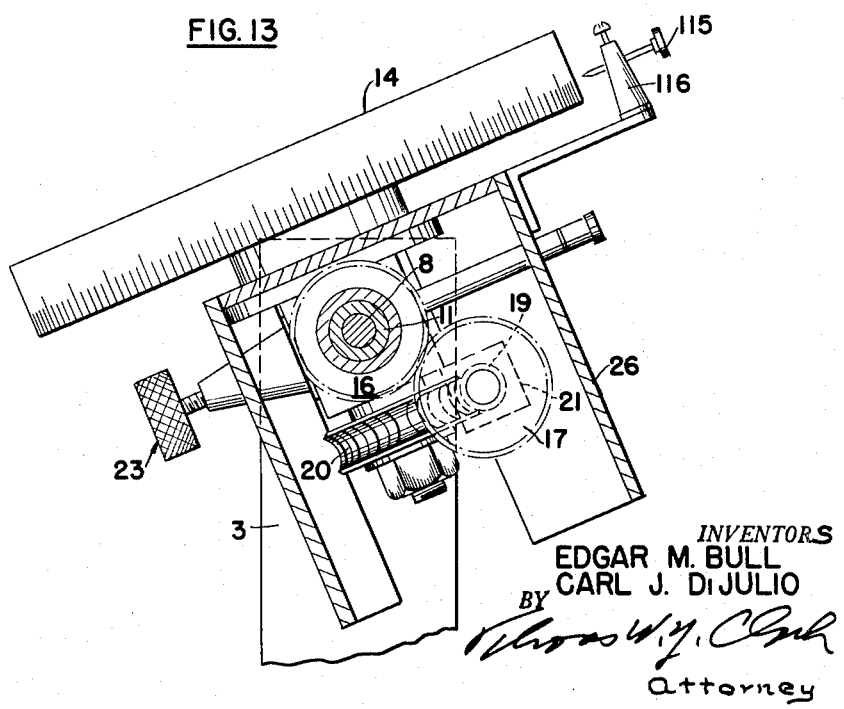
Figure 13 is a partial view from the right side similar to Figure 8.

Figures 2, 7 and 12 show the degree pointer 30 which is fixed to protractor spindle 29 for indicating the angular orientation of the table in cooperation with protractor 31 mounted on the base 1 by means of bracket 32. The shaft block 7 rocks in journals provided by opening 5 in column 3 and by the left end of gear shaft 11, when the table lock 28 is loosened. Since the rocking is about the axis of gear 16, gear 17 remains in mesh with gear 16 and the proper relation of the gears is maintained. When it is desired to have the table horizontal, a trunnion lock 33 and bolt 34 are secured to column 3 as shown in Figures 3, 10 and 11, the leg 35 of the lock 33 then abutting the front side of shaft block 7 and holding it vertical.

The indexing mechanism for the machine will now be described. An index plate 36 is mounted loosely on the gear shaft 11 by means of plate carrier 37. Set screw 38 in the plate carrier 37 engages annular groove 39 in gear shaft 11 to hold the carrier on the shaft, Figures 6 and 7. Bracket 40, Figures 5 and 6, also serves to retain the carrier in place. The outer periphery of the index plate has teeth 41 cut therein meshing with a worm index spindle 42 in a cylindrical housing 43. The housing is mounted on column 4 by bracket 44, Figure 7. A bracket adjuster 45 in cooperation with elongated slot 45' in the bracket fixes the bracket 44 to the column and provides for the vertical adjustment of the index spindle into and out of mesh with the index plate teeth. A dial 46 and lock nut 47 on one end of the spindle 42 and a nut 49 and washer 50 at the other end hold the spindle in its housing 43. The dial 46 is mounted in close relation to annular flange 51 of housing 43. By releasing the knurled lock nut 47, the dial can be moved independently of the index spindle 42 to set the dial to zero when desired.

The crank 15 comprises a lever arm 52 having an elongated slot 53 engaging gear shaft 11 between collar 54 and washer 55. A nut 56 clamps the lever arm 52 in any desired position, Figures 1 and 7. An index pin shaft 57, forming the outer casing of crank 15, is fixed to one end of the lever arm and has an index pin 59 therein. An index pin nut 60 has external threads engaging in the end of shaft 57 and is provided with a diametric rectangular notch 61. Index pin head 62 has a rectangular flat 63 for cooperation with the notch 61 of nut 60. Figure 7 shows pin 59 retracted from index plate 36 against the action of compression spring 64 in the shaft and being held in retracted position by the turning of head flat 63 crosswise to notch 61. Figure 5 shows the pin released with head flat 63 turned to register with notch 61 and advanced by spring 64 into the notch. In this position the pin 59 is inserted in one of the holes in index plate 36, Figure 1. Index pin arm stops 65, 66 are mounted on gear shaft 11 between the collar 54 and the index plate and are relatively adjustable by means of arcuate slot 67 in stop 65 and screw 69 in stop 66.

If worm gear 20 has 40 teeth, one revolution of crank 15 would turn table 14 through 9°. The innermost circle of holes 70 in index plate 36 may number 18 so that moving index pin 40 between adjacent holes would turn the table through ½°. Other circles of holes may have different numbers of holes to provide other degrees of indexing and other index plates with different numbers of holes can be substituted. If there are 270 teeth on index plate 36, each revolution of dial 46 would turn table 14 through two minutes of arc. If dial 46 has 240 graduations, each graduation would represent one-half second of turn of the table. Thus the dial makes possible the direct reading of the table angular position to fractions of a second of arc.

Indexing bracket 71 on column 4 mounts index plate lock 72, Figure 1, which sets the index plate when it is desired to use the crank and index plate without dial 46. The index spindle can be lowered out of mesh with the index plate teeth by bracket adjuster 45. If dial 46 is to be used, plate lock 72 is released, the index spindle raised into mesh with the index plate teeth and index pin 59 is inserted in one of the holes. The crank may then be turned through the dial 46 and index plate 36. Set screw 38 can be tightened to fix the carrier 37 relative to gear shaft 11 to relieve strain from the pin 59 in turning the gear shaft bracket.

Since the ordinary index plate requires elaborate tables and sometimes calculations on paper and conversion from degrees, minutes and seconds to decimal parts of an arc, the dial 46 is of great value in solving the problems for which this invention is intended. For example, suppose it were desired to generate an angle of 10 degrees, 32 minutes, 12 seconds using the holes in the index plate 36 and crank 15. This angle would first be converted to seconds, and divided by the number of seconds in 9°, which is the equivalent of one complete revolution of crank 15. Then 10° 32′ 12″=37,932 seconds and 37,932 divided by 32,400=1.1707; therefore this indexing can be made by one complete turn and 0.1707 part of a turn. The fractional part, 0.1707 of a turn can be obtained by moving 7 holes in the 41-hole circle. One would then select an index plate having a 41-hole circle, attach it to the machine, and adjust crank 15 by means of slot 53 and nut 56, so that index pin 59 is at the radius corresponding to the 41-hole circle. The backlash could then be taken up by turning crank 15 in the forward direction and with pin 59 released into one of the 41 holes, the index plate lock 72 being set. The work could then be aligned on the table and the index pin stops 65, 66 adjusted, the knife edge of one being disposed before the initial one of the 41 holes and the edge of the other being located after the seventh hole from the initial hole, if desired. The pin 59 would then be retracted and the crank turn one full revolution back to the initial hole and then seven holes beyond, the pin 59 being released into this hole and the table spindle lock 23 applied to hold the table in position.

On the other hand, if dial 46 were used for this setting of 10° 32′ 12″, the 18-hole circle could be used. This circle divides the 9° of table rotation for one crank revolution into half degree steps. Three holes on this circle would represent 1° and 30′, and the 2′ and 12″ would be one revolution of the dial 46 and twenty-four of the half-second graduations on the dial in addition. Thus only the one 18-hole circle is necessary on the index plate and angles can be set directly and expeditiously without the use of calculations or tables and without the necessity of a number of index plates for many angle settings.

A height adjusting bracket 73, in upper position being shown in dotted lines in Figure 7, is mounted on column 3 by means of runner blocks 74 fixed in vertical channels 75, Figure 5, of column 3. Bolts 76 ride in vertical side slots 77 of bracket 73 and clamp the bracket at the desired height against blocks 74. The bracket 73 has vertical side slots 78 corresponding to slots 77 for receiving the blocks as seen in Figure 5. A central slot 79 provides for table lock 28. The bracket 73 has a longitudinal horizontal channel 80, receiving a rectangular bar 81, having a cylindrical opening 82 aligned with the central axis of table 14. Set screw 83 fixes the opening 82 at any desired position over table 14.

A second height adjusting bracket 84, in upper position being shown in dotted lines in Figure 7, is mounted on column 4 at the rear by means of U-bracket 85 held by bolt 86 in column 4. The bracket 84 has therein a rectangular channel 86′ fitting over bracket 85 and the bracket 84 is clamped at the desired height by screw 87 in bracket 85. Bracket 84 has thereon block 88 having therein a horizontal channel 89 extending longitudinally of the machine. In this channel 89 slides slide arm A of a right angle bar 90, Figure 14, whose position is controlled by horizontal screw 91 and vertical screw 92 in bracket cover plate 93. The B arm 94 of right angle bar 90 has a channeled tracer block 95, a part of the bottom portion having a projection 96 having the vertical cylindrical hole 97 therein. The block 95 has a cover 98. Screws 99—100 clamp the tracer block 95 at any desired position along B arm 94.

An angle generating arm 101, sometimes referred to as angle arm C, has a cylindrical pin 102 for fitting closely in a center hole in tapered center 103 in spindle 13, Figures 7 and 14, a double-U-shaped lock and clamp 104 cooperates with oval openings 105 radially cut in table 14 and T bolt 106 and nut 107 to fix angle arm 101, relative to table 14, Figures 14 and 16. C arm 101 has a tracer block 109 sliding thereon for positioning two cylindrical holes 110 and 111. A cylindrical pin 112 closely fits through hole 97 of B arm tracer block 95 and into hole 110 or 111 when they are vertically aligned. Screw 113 clamps block 109 on arm 101.

Figures 14 and 17 illustrate the solution of a right triangle by the instrument, given the value of an angle and the opposite side thereof. The value of the opposite side is set at cover plate 93 on slide arm A. The scale on slide arm A, of right angle bar 90 is laid off to indicate the distance as projected at right angles onto slide arm A between the center of pin 102 of angle arm C and the center of hole 97 of tracer block 95 of slide arm B. Let this distance, indicated by reference numeral 114, be 1.6875 inches.

As indicated in Figure 17, the angle is to be measured counterclockwise, taking the zero position to be in the transverse direction of the machine, through the center of slot 80 of the height adjusting bracket 73. As seen in Figures 1, 4, 5 and 15, the table may be graduated in degrees around its periphery and a degree reference needle 115 supported on a mounting bracket 116 may indicate roughly the angular position of the table.

To set the C arm 101 so that its angular position can be read approximately from the table scale, the table is turned until zero on the table scale registers with the degree reference needle 115. All backlash in crank 15 is taken up. The index plate 36 is then rotated by means of dial 46, with set screw 38 released, until one of the holes in the 18-hole circle is in line with pin 59 of crank 15. Pin 59 is then released into the hole of the 18-hole circle, and set screw 38 is tightened. The index plate lock 72 is then firmly applied. In this manner the table graduations will correspond to the actual angular position of the table to within one minute of arc, since the teeth in index plate lock 72 and the index plate teeth are separated by two minutes of arc. The dial 46 may now be set to zero by loosening lock nut 47 and turning the dial to the zero mark on flange 51.

With the first height adjusting bracket 73 in lower position, its top approximately at table level, the angle generating C arm 101 is positioned on the table so that its angle generating edge 117 extends across the center of channel 80 of bracket 73. A bar 119 one half the width of the channel is then inserted in the channel and the edge 117 of angle arm 101 brought in line with the bar which is pressed against channel wall 120. This sets the C arm 101 perpendicular to A arm and parallel to B arm 94 for zero angle. Lock 104 is then applied to fix the C arm on the table. The initial hole in which pin 59 is located is preferably marked by means of one of the index pin stops 65, 66. The C arm is now prepared to generate an angle which will be roughly indicated by the table degree graduations and which is precisely determined by the crank, index plate and dial.

In Figures 14 and 17, in the solution of the right triangle with opposite side of 1.6875 inches, let the angle be 61° 35′ 22.55″. With set screw 38 released, the crank is turned through six complete revolutions, 54°, and 15 holes in the 18-hole circle, 7° 30′, and the pin released into the fifteenth hole from the initial hole. If the initial hole is numbered "0," the fifteenth hole would be numbered "15." Set screw 38 may now be tightened and index plate lock 72 released. The table and C arm having been turned through 61½°, the dial must turn the table 5′ and 22.55″. This is two complete revolutions, 4′, a half revolution, 1′, and forty-five graduations past the half revolution mark 22.5″. The 0.05 second would be 1/10 of a graduation and could be easily read directly by a suitable vernier on the annular flange 51. An arc of 0.01 second could be judged with this vernier.

The value of the adjacent side of the triangle is now determined by sliding tracer blocks 95 and 109 into conjunction so that cylindrical pin 112 can be fitted through hole 97, and into outer hole 110. Tracer block 95 on the B arm reads the length of the adjacent side, which would be 0.9198 inch. Verniers could be engraved or screwed on tracer blocks 95 and 109 and on the cover plate 93 of the second height adjusting bracket 84 which would read directly to one-thousands of an inch and ten-thousands of an inch could be estimated with considerable accuracy.

The radius or hypotenuse of the triangle is read from tracer block 109. If the scale reads the actual distance of the zero point from the center of table, one inch would be added when the hole 111 is used and one inch would be subtracted when outer hole 110 is used.

If it were desired to drill a hole in a plate, given a certain reference line on the plate and the hole to be at a certain angle to the reference line measured from a particular point on the reference line, say 61° 35′ 22.55″, and the perpendicular distance from the center of the hole to the reference line being 1.6875 inches, it will be appreciated that hole 97 of tracer block 95 is exactly centered on this point in Figure 17 with reference to the center of the table and the center of channel 80. The parts should be moved in Figure 14 to correspond with those in Figure 17.

To position a piece of work for drilling this hole, the pin 112 is removed from holes 110 and 97, and the C arm 101 turned back to zero and removed from the table. The work is then positioned on the table with the reference line on the work with the center line of the channel 80, and the given point on the reference line above the center of the table. The table spindle lock 23 is applied and the work is clamped to the table by any suitable means. Right angle bar 90 is firmly fixed by means of screws 91 and 92 in cover plate 93 and tracer block 95 is fixed on B arm 94 by means of screws 99—100. A drill bushing of the proper size is then mounted in hole 97, and with the tool clamped in proper position on any ordinary inexpensive drill, the hole is made. Thus the solution of the problem and the drilling are substantially parts of a single continuous and rapid process, the settings of tracer blocks 95 and cover plate 93, once being determined, remain unchanged for the drilling operation.

If it were desired to find the cotangent of a given angle without using tables and without the necessity for interpolation, and with a given radius of a reference circle, this could be done by setting the A arm at the given radius, and generating the angle as before by means of C arm 101. The cotangent would be read on slide arm B from tracer block 95 when holes 97 and 110 or 111 were in conjunction.

It will be apparent that various modifications in the precise construction of the machine may be made without departing from the invention as defined in the following claims.

What is claimed as new and is desired to be secured by Letters Patent is:

1. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, a circular index plate rotatably mounted on said gear shaft, and having teeth on its periphery, a second worm mounted transversely on the gear shaft supporting column and meshing with the index plate teeth, and means for connecting said gear shaft with said index plate whereby the spindle is rotatable by rotation of said second worm.

2. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, an index plate rotatably mounted on said gear shaft and having teeth on its periphery, a second worm mounted transversely on the gear shaft supporting column and meshing with the index plate teeth, means for connecting said gear shaft with said index plate whereby the spindle is rotatable by rotation of said second worm, the shaft block column and gear shaft having aligned circular bearings for mounting said shaft block for rocking movement in the bearings to rock the spindle on an axis at right angles to its axis of rotation.

3. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, and an index plate mounted adjacent said gear shaft, said crank having an index pin cooperating with said index plate for indexing said spindle rotation.

4. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, an index plate mounted adjacent said gear shaft, said crank having an index pin cooperating with said index plate for indexing said spindle rotation, the shaft block column and gear shaft having aligned circular bearings for mounting said shaft block for rocking movement in the bearings to rock the spindle on an axis at right angles to its axis rotation.

5. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, a carrier mounted for rotation on said gear shaft, a circular index plate fixed to said carrier and mounted axially of said gear shaft, said index plate having teeth in the periphery thereof, a worm for meshing engagement with said index plate teeth, means for mounting said worm in meshing relation to said index plate teeth, and means for fixing said carrier against rotation relative to said gear shaft whereby rotation by said worm will rotate said spindle.

6. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, a carrier telescoping over said gear shaft and adapted for relative rotation thereto, a circular index plate fixed to said carrier axially of said gear shaft and having teeth around the periphery thereof, an indexing crank fixed to said gear shaft and having an index pin mounted therewith for cooperation with said index plate, a worm adapted to mesh with the index plate teeth, a housing for said worm, an adjustable bracket mounting said worm housing for moving said worm into and out of mesh with the index plate teeth, a circular flange at the end of said housing, and a dial fixed to said worm cooperating therewith.

7. A universal index comprising a base, a pair of columns upstanding therefrom, a shaft block supported at one end in one of said columns, a gear shaft supported in the other of said columns and mounting the other end of said shaft block, a first gear fixed to said gear shaft between its supporting column and said shaft block, a worm mounted longitudinally of and below said shaft block and supported thereby, a second gear fixed to said worm and meshing with said first gear, a spindle mounted upright in said shaft block, a worm gear fixed to said spindle below said shaft block and meshing with said worm, a crank fixed to said gear shaft for turning said spindle, a carrier telescoping over said gear shaft and adapted for relative rotation thereto, a circular index plate fixed to said carrier axially of said gear shaft and having teeth around the periphery thereof, an indexing crank fixed to said gear shaft for cooperation with said index plate, a worm adapted to mesh with the index plate teeth, a housing for said worm, a bracket mounting said worm housing, a circular flange at the end of said housing, and a dial fixed to said worm cooperating therewith.

References Cited in the file of this patent

UNITED STATES PATENTS

| Number | Name | Date |
|---|---|---|
| 612,412 | Grohmann | Oct. 18, 1898 |
| 893,954 | Huffel | July 21, 1908 |
| 1,312,277 | Shields | Aug. 5, 1919 |
| 1,341,646 | Jesnig | June 1, 1920 |
| 1,414,970 | Nelson | May 2, 1922 |
| 1,477,374 | Marshall | Dec. 11, 1923 |
| 1,615,668 | Anderson | Jan. 25, 1927 |
| 2,295,022 | Yanchek | Sept. 8, 1942 |
| 2,342,539 | Gorton | Feb. 22, 1944 |
| 2,376,601 | Kiesel | May 22, 1945 |
| 2,388,320 | Gardiner | Nov. 6, 1945 |
| 2,484,758 | Sonnie | Oct. 11, 1949 |
| 2,536,937 | Hosea | Jan. 2, 1951 |